United States Patent
Bertolini et al.

(10) Patent No.: US 12,212,235 B2
(45) Date of Patent: Jan. 28, 2025

(54) CONTROL CIRCUIT FOR CONTROLLING A SWITCHING STAGE OF AN ELECTRONIC CONVERTER, CORRESPONDING ELECTRONIC CONVERTER DEVICE AND METHOD

(71) Applicant: STMicroelectronics S.r.l., Agrate Brianza (IT)

(72) Inventors: Alessandro Bertolini, Vermiglio (IT); Alberto Cattani, Cislago (IT); Stefano Ramorini, Milan (IT); Alessandro Gasparini, Cusano Milanino (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 227 days.

(21) Appl. No.: 17/671,163

(22) Filed: Feb. 14, 2022

(65) Prior Publication Data
US 2022/0263412 A1    Aug. 18, 2022

(30) Foreign Application Priority Data
Feb. 15, 2021   (IT) .................. 102021000003368

(51) Int. Cl.
*H02M 3/158* (2006.01)
*H02M 1/00* (2006.01)
*H02M 1/08* (2006.01)

(52) U.S. Cl.
CPC ......... *H02M 3/158* (2013.01); *H02M 1/0009* (2021.05); *H02M 1/08* (2013.01)

(58) Field of Classification Search
CPC ............ H02M 3/00; H02M 3/02; H02M 3/04; H02M 3/10; H02M 3/135; H02M 3/137;
(Continued)

(56) References Cited

U.S. PATENT DOCUMENTS 7,372,241 B1 * 5/2008 Tomiyoshi .......... H02M 3/1588
323/283
9,841,779 B2 * 12/2017 Wang ...................... G05F 3/262
(Continued)

OTHER PUBLICATIONS

IT Search Report and Written Opinion for priority application, IT Appl. No. 102021000003368, report dated Oct. 15, 2021, 10 pages.

*Primary Examiner* — Thienvu V Tran
*Assistant Examiner* — Carlos O Rivera-Perez
(74) *Attorney, Agent, or Firm* — Crowe & Dunlevy LLC (57) ABSTRACT

A control circuit operates to control a switching stage of an electronic converter. The control circuit includes: first terminals providing drive signals to electronic switches of the switching stage; a second terminal receiving from a feedback circuit a first feedback signal proportional to a converter output voltage; and a third terminal configured to receive from a current sensor a second feedback signal proportional to an inductor current. A driver circuit provides the drive signals as a function of a PWM signal generated by a generator circuit as a function of the first and second feedback signals, a reference voltage and a slope compensation signal. A mode selection signal is generated as a function of a comparison between the input voltage and the output voltage. A feed-forward compensation circuit is configured to source and/or sink a compensation current as a function of a variation in the mode selection signal.

17 Claims, 4 Drawing Sheets

(58) Field of Classification Search
CPC .... H02M 3/142; H02M 3/155; H02M 3/1552; H02M 3/156; H02M 3/1563; H02M 3/1566; H02M 3/157; H02M 3/158; H02M 3/1582; H02M 3/1588; H02M 1/0003; H02M 1/0009; H02M 1/0016; H02M 1/0019; H02M 1/0022; H02M 1/0025; H02M 1/08; H02M 1/088; H02M 1/14; H02M 1/143; H02M 1/15; Y02B 70/10
USPC ........ 323/222–226, 259, 266, 270–275, 277, 323/278, 280, 282–285, 288, 351
See application file for complete search history.

(56) References Cited

U.S. PATENT DOCUMENTS

| | | | |
|---|---|---|---|
| 2009/0128116 A1 | 5/2009 | Noda | |
| 2012/0146602 A1* | 6/2012 | Chen | H02M 3/1582 323/282 |
| 2014/0084882 A1* | 3/2014 | Namekawa | H02M 3/1582 323/271 |
| 2015/0303807 A1 | 10/2015 | Garvey et al. | |
| 2018/0367035 A1 | 12/2018 | Li | |
| 2019/0020278 A1 | 1/2019 | Raval et al. | |
| 2020/0321870 A1* | 10/2020 | Tsai | H02M 3/07 |

\* cited by examiner

CONTROL CIRCUIT FOR CONTROLLING A SWITCHING STAGE OF AN ELECTRONIC CONVERTER, CORRESPONDING ELECTRONIC CONVERTER DEVICE AND METHOD

PRIORITY CLAIM

This application claims the priority benefit of Italian Application for Patent No. 102021000003368, filed on Feb. 15, 2021, the content of which is hereby incorporated by reference in its entirety to the maximum extent allowable by law.

TECHNICAL FIELD

The description relates to DC-DC converters and, in particular, non-isolated converters such as boost converters.

One or more embodiments may be applied to power AMOLED technology devices.

BACKGROUND

Power-supply circuits, such as AC/DC or DC/DC switched mode power supply circuits, are well known in the art. There exist many types of electronic converters, which are mainly divided into isolated and non-isolated converters. For instance, non-isolated electronic converters are the converters of the "buck", "boost", "buck-boost", "Ćuk", "SEPIC", and "ZETA" type. Instead, isolated converters are, for instance, converters of the "flyback", "forward", "half-bridge", and "full-bridge" type. Such types of converters are well known to the person skilled in the art, as evidenced e.g., by the application note AN513/0393 "Topologies for Switched Mode Power Supplies", L. Wuidart, 1999, STMicroelectronics (incorporated herein by reference).

DC-DC converters, in particular boost-type ones, can be used in a variety of applications. Depending on the application, in order to provide adequate efficiency and performance levels, the converter circuit is desired to work in different modes (e.g., Continuous-Conduction Mode (CCM), Discontinuous-Conduction Mode (DCM), asynchronous mode, synchronous mode, etc.) and to operate reliably in different scenarios. In such conditions, the design of a DC-DC converter is rather complicated.

For instance, DC-DC converters can be used to provide a supply voltage level to an AMOLED display by converting a battery-fed voltage level VIN, e.g., between 2.3-5 Volts, to a (positive) output regulated voltage level VOUT, e.g., about 4.6 Volts.

In such an application scenario, any ripple/transient on the (positive) regulated supply directly affects the display performance, e.g., causing display flickering. This constrains the output regulated voltage to be as flat and smooth as possible. To this end, existing solutions may envisage use of a buck-boost type converter. Drawbacks of such existing solutions can comprise, e.g.: increased circuit complexity with respect to boost-type converters; increased complexity, for instance due to the use of more power switches than those of a boost-type converter; increased silicon area occupancy and costs; and increased leakage and quiescent current consumption of the power transistors employed.

There is a need in the art to contribute in overcoming the aforementioned drawbacks.

SUMMARY

One or more embodiments may relate to a method.

A control circuit for controlling a switching stage of an electronic converter may be exemplary of such a method. For instance, the control circuit may be an integrated circuit.

One or more embodiments may relate to a corresponding device. A boost-type electronic converter may be exemplary of such a device.

One or more embodiments may relate to a corresponding method of controlling a switching stage of an electronic converter.

One or more embodiments may facilitate compensating transitions, e.g., from synchronous mode to asynchronous mode and vice versa, in closed-loop DC-DC converters.

One or more embodiments may facilitate increasing or improving the performance of a DC-DC converter.

One or more embodiments may improve capability to adequately compensate any transitions between synchronous/asynchronous modes while negligibly affecting output levels.

One or more embodiments may have a small footprint in terms of area and current consumption, with minimum control logic to enable improved operation.

One or more embodiments may advantageously maintain DC-DC open loop characteristics while moving an operating point of the loop thanks to feed-forward actions.

In one or more embodiments, DC gain as well as loop bandwidth and phase margin can be improved, in particular in an asynchronous mode.

One or more embodiments may facilitate providing a DC-DC loop that is faster and more reactive.

One or more embodiments may contribute in pushing a second pole of the transfer function of the converter circuit in a higher frequency range with respect to that of prior art designs.

BRIEF DESCRIPTION OF THE DRAWINGS

One or more embodiments will now be described, by way of non-limiting example only, with reference to the annexed Figures, wherein.

DETAILED DESCRIPTION

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment.

Moreover, particular conformations, structures, or characteristics may be combined in any adequate way in one or more embodiments.

Throughout the figures annexed herein, like parts or elements are indicated with like references/numerals and a corresponding description will not be repeated for brevity.

The references used herein are provided merely for convenience and hence do not define the extent of protection or the scope of the embodiments.

For the sake of simplicity, identical designations may be used herein for designating both certain circuit nodes and signals occurring at those nodes.

Figure 1:
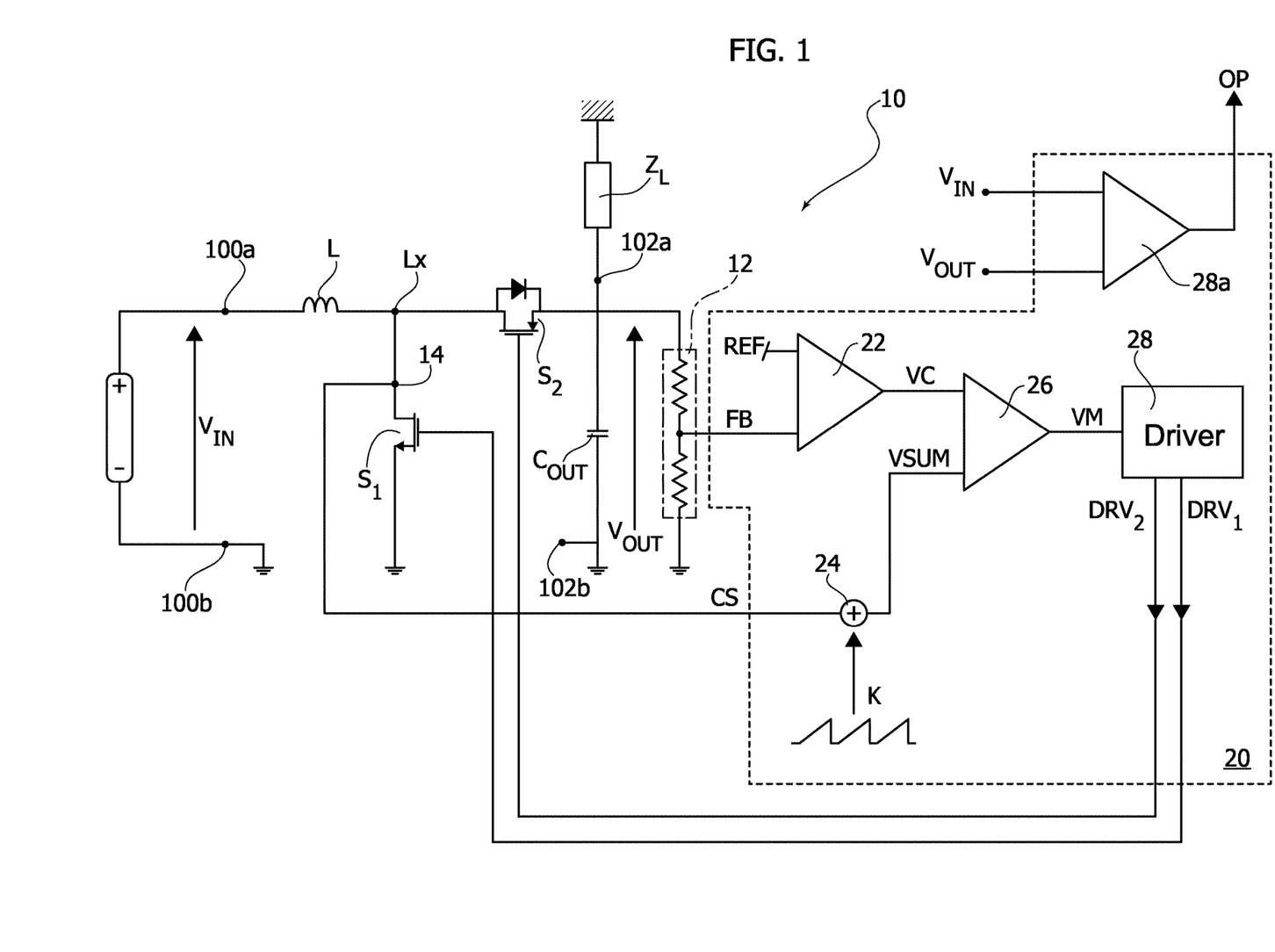
FIG. 1 shows an example of a boost-type electronic converter.

FIG. 1 is a circuit diagram of a boost-type DC-DC converter circuit 10 configured to provide a supply voltage level to a load, such as an AMOLED display. As exemplified in FIG. 1, the circuit 10 comprises control circuitry 20 configured to operate the boost converter 10, for instance with a peak-current control scheme.

As exemplified in FIG. 1, the circuit 10 comprises two input terminals 100a and 100b for receiving a DC input voltage $V_{IN}$ (e.g., provided by a battery) and two output terminals 102a and 102b for supplying a regulated output voltage VOUT (e.g., to a load $Z_L$).

In particular, a boost converter 10 comprises two electronic switches S1 and S2 (with the current path thereof) connected (e.g., directly) in series between the output terminal 102a and the input terminal 100b, wherein the intermediate node between the electronic switches S1 and S2 represents a switching node Lx. Specifically, the electronic switch S2 is a high-side switch connected (e.g., directly) between the (positive) terminal 102a and the switching node Lx, and the electronic switch S1 is a low-side switch connected (e.g., directly) between the switching node Lx and the (negative) terminal 100b, which often represents a ground GND. The (high-side) switch S2 and the (low-side) switch S1 hence represent a half-bridge configured to connect the switching node Lx to the terminal 102a (voltage $V_{OUT}$) or the terminal 100b (ground GND).

For example, the switches S1 and/or S2 are often transistors, such as Field-Effect Transistors (FETs), such as Metal-Oxide-Semiconductor Field-Effect Transistors (MOSFETs), e.g., n-channel FET, such as NMOS, or p-channel FET, such as PMOS. Frequently, the second electronic switch S2 is also implemented just with a diode, where the cathode is connected to the terminal 102a and the anode is connected to the switching node Lx.

In the example considered, an inductance L, such as an inductor, is connected (e.g., directly) between the switching node Lx and the (positive) input terminal 100a, while the (negative) input terminal 100b is connected (e.g., directly) to the (negative) output terminal 102b.

In the example considered, to stabilize the output voltage $V_{OUT}$, the converter 10 comprises a capacitor $C_{OUT}$ connected (e.g., directly) between the output terminals 102a and 102b.

As exemplified in FIG. 1, the converter circuit 10 is coupled to a control circuit 20 configured to drive switches S1, S2. Specifically, the control circuit 20 is configured to provide a first control signal $DRV_1$ for switching the first electronic switch S1 and a second control signal $DRV_2$ for switching the second electronic switch S2. As a function of receiving respective control signals from the control circuit 20, switches S1 and S2 are controlled to switch from a first, e.g., open state to a second, e.g., closed state.

Such controlled switching facilitates control of a voltage level Vx at the switching node Lx (i.e., the voltage at the first switch S1) and a current $I_L$ traversing the inductor L.

Figure 2:
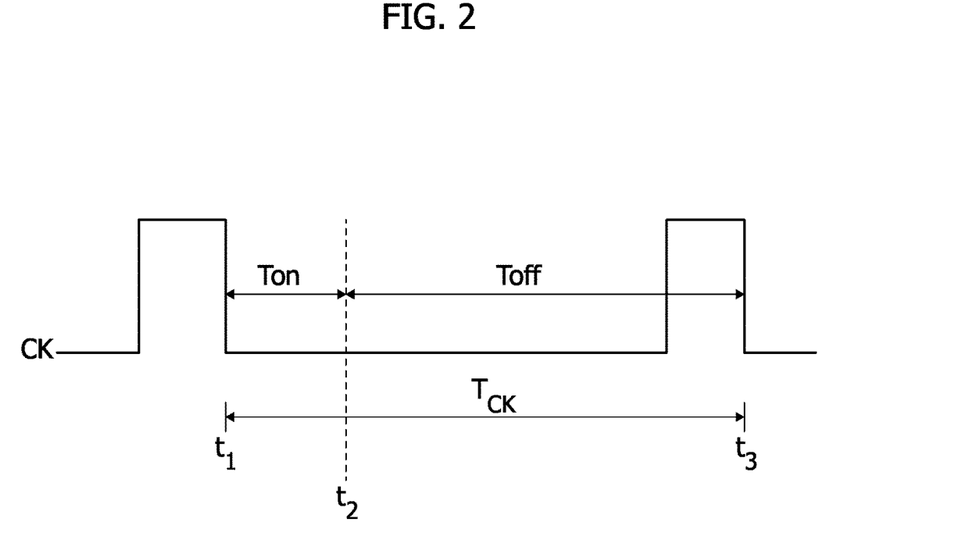
FIG. 2 shows an exemplary time diagram of signals of the electronic converter of FIG. 1.

As exemplified in FIG. 2, the switching cycle can start at a falling edge of the clock signal CK, with the first switch S1 in the ON state for the $T_{ON}$ phase.

In particular, as exemplified in FIG. 2:
at a first time instant t1, the electronic switch S1 is closed (ON state) and the electronic switch S2 is at the same time open, so that the current $I_L$ in the inductor L increases (substantially) linearly;
at a second instant $t_2$ separate from the first instant t1 by a time interval $T_{ON}$, the electronic switch S1 is opened and the electronic switch S2 is closed (OFF state), so that the current $I_L$ decreases (substantially) linearly; and
at a third time instant $t_3$ separate from the second time instant t2 by a time interval $T_{OFF}$, the switch S2 (or a similar diode) is hence closed when the switch S1 is open, and vice versa.

The current $I_L$ can thus be used to charge the capacitor $C_{OUT}$, which supplies the voltage $V_{OUT}$ at the output terminals 102a and 102b.

As exemplified in FIG. 1, the control circuit 20 is configured to apply a peak current with fixed-slope compensation ramp control scheme to drive the switching of the switch S1, and possibly of the switch S2, for repeating the intervals $T_{ON}$ and $T_{OFF}$ periodically, in a so-called switching cycle of constant period $T_{CK}=T_{ON}+T_{OFF}$ and synchronized to the reference clock signal CK (see FIG. 2), but whose duty cycle $\delta=T_{ON}/T_{CK}$ can vary.

Current-mode control is a multiple-loop control method wherein the inductor current is directly controlled.

For example, the converter circuit 10 comprises:
a first feedback circuit 12, such as a voltage divider, configured to generate a feedback signal FB indicative of (and preferably proportional to) the output voltage $V_{OUT}$, and
a second feedback circuit 14, such as a current sensing resistor in series with the first switch S1, for instance, or any other current sensor arrangement to "read" a coil current $I_L$ and obtain a measurement signal indicative of the current flowing within the coil L during the interval Ton, in a manner per se known; the second feedback circuit 14 thus generates a measurement signal CS indicative of (and preferably proportional to) the current $I_L$ flowing during the interval $T_{ON}$ through the inductance L.

In one or more embodiments, the measurement signal CS can be pulsed or an averaged current value.

As exemplified in FIG. 1, the control circuit 20 is coupled to the first feedback circuit 12 and receives the feedback signal FB, and coupled to the second feedback circuit 14 and receives the measurement signal CS.

In the example considered, the control circuit 20 comprises:
an error amplifier circuit 22, such as an operational amplifier, for instance, the amplifier 22 configured to perform a comparison of the feedback signal FB with a reference signal, such as a reference voltage $V_{REF}$, producing a control signal $V_C$ as a result of the comparison;
a sum circuit 24 configured to superimpose a compensation signal K to the measurement signal CS, producing a sum signal VSUM as a result of the superposition; for instance, the compensation signal K can be a sawtooth ramp, retained to stabilize the current loop feedback, increasing noise immunity as a result;

a main comparator circuit 26 coupled to the error amplifier circuit 22 and to the sum circuit 24 and configured to perform a comparison between the control signal $V_C$ and the sum signal VSUM received therefrom, providing a (digital) modulation signal VM as a result of the comparison, and a driver circuit 28 configured to generate the one or more drive signals $DRV_1$, $DRV_2$ as a function of a Pulse-Width Modulation (PWM) signal VM, wherein the driver circuit 28 is configured to change mode of operation of the converter 10 as a function of the control signal VM. For example, in various embodiments, the driver circuit 28 is configured to selectively operate the switching stage S1, S2 in synchronous or asynchronous mode as a function of the control signal OP, as discussed in the following.

According to the control scheme considered in this example, the control circuit 20 can be configured to drive the converter 10 so that:

at the first time-interval t1, the first switch S1 is closed (ON state) until the modulation signal VM obtained as a function of the comparison performed by the main comparator 26 triggers the drive signals $DRV_1$, $DRV_2$ to change the status of the switches S1, S2, determining the duration of Ton of this first phase; and at the second time-interval t2, separate from the first time instant t1 by the duration Ton, the first switch S1 is open (OFF state) and the second switch S2 is closed (ON state), until a subsequent falling edge of the clock signal CK (that is, until a new switching cycle begins); this determines the duration Toff of this second phase.

The main comparator circuit 26, in performing over time the comparison between the sum signal VSUM and the level of the control signal VC produced by the error amplifier 22, outputs the modulation signal VM having a first binary value, e.g., "1", if the sum signal VSUM reaches the level of the control signal VC, or having a second binary value, e.g., zero if the sum signal VSUM fails to reach the level of the control signal VC.

As mentioned, the compensation signal K facilitates overcoming limits due to limit cycles and sub-harmonic oscillations of the DC-DC converter, e.g., pushing poles of a transfer function of the converter towards a frequency range higher than that in use. For instance, a second pole of such a transfer function is "pulled back" in frequency as a function of a slope of the compensation signal K, that is with a bigger (namely, higher amplitude) sawtooth signal. Preferably, the compensation signal K is used for duty-cycles above 50%.

An arrangement as exemplified in FIG. 1 can have its input nodes 100a, 100b coupled to a battery, e.g., providing a voltage $V_{IN}$=(2.3÷5) Volt, and at least one of its output nodes 102a, 102b, for instance output node 102a, to an AMOLED display, in order provide a (positive) voltage supply thereto. For instance, at the same time the other output node 102b could be grounded and not directly coupled to the AMOLED panel.

In such an exemplary application scenario, the converter circuit 10 may be operated:

in a first "synchronous" mode when $V_{IN} < V_{OUT}$, with the control circuit 20 driving both transistors S1, S2 to switch on/off via drive signals $DRV_1$, $DRV_2$; and in a second "asynchronous" or "diode" mode when $V_{IN} \geq V_{OUT}$, with the control circuit 20 driving the first transistor S1 to switch ON/OFF via the drive signal $DRV_1$ while the second transistor S2 is operated as a diode, exploiting its body diode conduction.

It is noted that diode-mode operation facilitates use of a boost DC-DC to maintain voltage regulation also for values of input voltage $V_{IN}$ close to values of the output voltage $V_{OUT}$, a maximum sustainable deviation depending on the body diode drop on the second transistor S2.

Conventional solutions can hardly provide smooth transition between operating modes, that is with no appreciable transient perturbation on the regulated output voltage $V_{OUT}$. Such a transient may alter the overall performance.

The Inventors have observed that, in order to counter DC-DC frequency response, detecting the threshold for a mode operation change in a way substantially automatic may be useful.

For instance, a (e.g., dedicated) "mode" control signal OP is provided by the control circuit 20 to select one of the first and second operation modes as a result of a comparison between input $V_{IN}$ and output $V_{OUT}$ voltage levels. This may involve a relatively simple circuit implementation, such as a comparator circuit block 28a within the control logic 20 as exemplified in FIG. 1, the comparator 28a being coupled to respective input/output nodes 100a, 102a and configured to trigger (possibly with a certain hysteresis for increasing operating margins, for instance) mode operation signal OP when VIN becomes higher than VOUT and vice versa.

The Inventors have further observed that increasing the DC-DC duty-cycle δ facilitates to counter any transient on the output voltage in transitioning from synchronous to diode-mode.

For instance, the duty-cycle δ can (approximately) be expressed as:

$$\delta = \frac{VOUT + I_L(DCRL + R_{S2}^{ON} + R_{S1}^{ON}) - VIN}{VOUT + I_L(DCRL + R_{S2}^{ON})}$$

where: $V_{OUT}$ is the output voltage, $V_{IN}$ is the input voltage, $I_L$ is the current in the inductance L, DCRL is the DC equivalent series resistance of the coil L, that is an equivalent resistance to the intrinsic parasitic resistance of the inductance L, as provided, e.g., by the manufacturer of the electronic component, $R_{S1}^{ON}$ is a (ON-state) resistance of first transistor S1, and $R_{S2}^{ON}$ is, at least during synchronous operation mode, the resistance of the second transistor S2.

It is noted that, during diode-mode operation, as the conduction takes place in the body diode of the second transistor S2 whose forward voltage varies as a function of the current $I_L$ in the inductance L, the behavior can be modeled as that the resistance $R_{S2}^{ON}$ of the second transistor S2 is much higher than that of the first resistor S1, e.g., $R_{S2}^{ON} >> R_{S1}^{ON}$.

As discussed with reference to FIG. 1, the DC-DC converter 10 can be modeled as a closed loop system with a certain (e.g., limited) loop bandwidth, which can hardly quickly compensate for abrupt changes such as those in the synchronous-to-diode-mode transitions.

One or more embodiments may perform feed-forward actions in order to increase the duty-cycle δ, that is to increase the on-state duration Ton at the expense of the off-state duration Toff. For instance, this may involve, alternatively: providing a positive step on the control signal VC, or providing a negative step on the sum signal VSUM.

In one or more embodiments, this bandwidth limitation can be overcome using feed-forward actions comprising dedicated "out-of-the-loop" compensation actions. As these feed-forwards actions can be out of the DC-DC main loop, they can be designed to be very fast and to quickly compensate a specific event, so that the main loop is "blind" to such input event.

Figure 3:
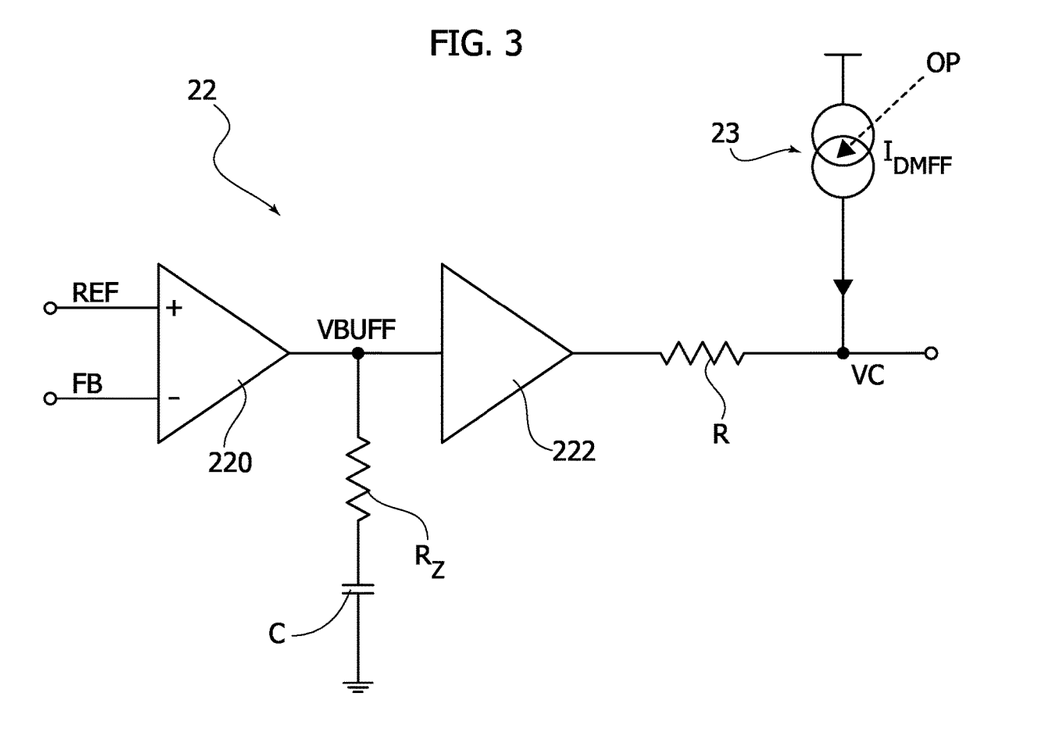
FIG. 3 shows an embodiment of a first portion of the converter of FIG. 1.

FIG. 3 shows a possible implementation of applying feed-forward compensation to the control signal $V_C$, adding a positive step signal (namely, an offset) on the output node of the error amplifier 22 when the converter 10 performs a synchronous-to-diode mode transition. For instance, the error amplifier 22 can comprise:

- an operational amplifier 220, e.g., an operational transconductance amplifier (OTA);
- an RC compensation network coupled to the output node of the OTA 220, configured to provide loop stability to the DC-DC converter 10;
- an optional buffer stage 222, e.g., a source follower, coupled to the output node of the OTA; and
- a current generator 224 and a resistor stage R intermediate the OTA output node and the generator, the latter being configured to source a certain current on a resistor R. The optional buffer stage 222 is particularly suited in cases where the error amplifier 22 comprises a single OTA stage, as exemplified in FIG. 3. In such cases, the buffer 222 is used to decouple the resistor R from the OTA output node.

For the sake of simplicity, in the following the effect of the feed-forward compensation is discussed mainly with respect to a transition from synchronous-to-diode-mode, being otherwise understood that one or more embodiments apply, vice versa, to diode-to-synchronous-mode transitions.

In One or More Embodiments:
- when the converter circuit 10 is operated in synchronous mode, the current generator IDMFF is OFF and the control signal $V_C$ is equal to the input voltage of the buffer $V_{BUFF}$, as there is no drop on R; and
- when the converter circuit is operated in diode-mode, the current generator $I_{DMFF}$ is enabled, e.g., via "mode" control signal OP, at the beginning of the switching cycle $T_{CK}$, adding a substantially step-like positive offset, which can be expressed as the resistance R times the current sourced thereon, to the control signal $V_C$, that is $V_C=V_{BUFF}+I_{DMFF}R$. As a result, the ON-state duration Ton is increased in the very same switching cycle.

Figure 4:
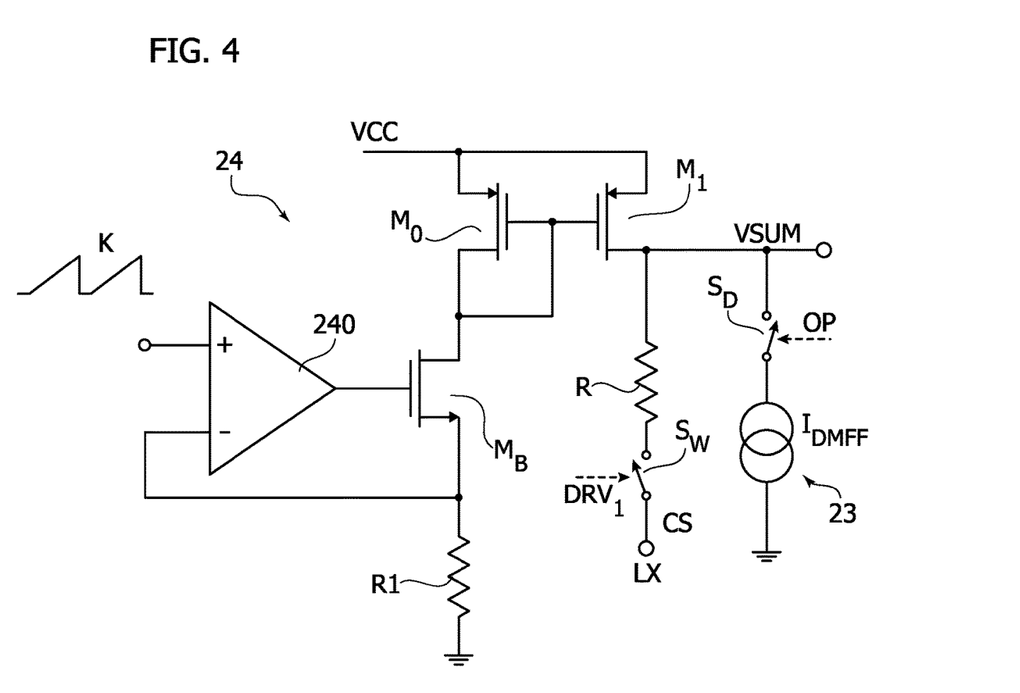
FIG. 4 shows an embodiment of a second portion of the converter of FIG. 1.

One or more embodiments as exemplified in FIGS. 3 and 4 can advantageously affect negligibly the DC-DC open loop characteristic while moving an operating point of the feedback loop of the converter 10.

FIG. 4 shows a possible alternative implementation of embodiments. As exemplified in FIG. 4, the current generator IDMFF is present at the sum circuit 24 configured to provide the sum signal VSUM.

As exemplified in FIG. 4, the sum circuit 24 can comprise:
- an operational amplifier 240 configured to receive the compensation signal K at a first, non-inverting, input node and to have a feedback loop between an output node and a second, e.g., inverting, input node, the feedback loop comprising a resistor R1 as well as transistor MB; in particular, the operational amplifier 240 is configured as a voltage-to-current buffer;
- a current mirror M0, M1 coupled to the output of the operational amplifier 240 and to the sum circuit 24; and
- a switch SW configured to selectively couple, as a function of the drive signal $DRV_1$, the switching node Lx to an adder resistance R during time interval Ton.

As exemplified in FIG. 4, the fixed sawtooth voltage signal K is buffered, converted in current and mirrored so as to superimpose to the signal containing the coil current information through the resistor R. For instance, in an arrangement as exemplified in FIG. 4 the compensation signal K is converted to a current that flows in the adder resistance R, resulting in a voltage drop K*R thereon. This is added, or "offset", during time interval Ton via the switch SW being driven by signal $DRV_1$ and the voltage drop on Lx is also applied to the adder resistance R. As a result, the sum signal $V_{SUM}$ is the voltage at the adder resistance R, which is the sum of the contribution of the value on the switching node Lx and a signal proportional to the compensation signal K.

For the sake of simplicity, an exemplary scenario in which the current mirror M0, M1 has a unitary mirroring factor is considered in the following, being otherwise understood that such a scenario is purely exemplary and in no way limiting.

For instance, in synchronous mode the switching node Lx is coupled to the resistor R when the first transistor S1 is in an on-state, that is during the Ton phase. As a result, the sum signal $V_{SUM}$ can be expressed as:

$$VSUM(t) = R_{S1}^{ON} \times I_{COIL}(t) + K(t) \times R/R1$$

As exemplified in FIG. 4, the sum circuit 24 further comprises a current generator 23 selectively couplable to the sum circuit 24 via a switch SD driven by a (e.g., dedicated) "mode" control signal OP from the control circuit 20, the current generator 23 configured to sink a certain current $I_{DMFF}$ from the adding resistor R. For instance, when the mode control signal OP switches from "synchronous" to "diode mode", the switch SD is turned ON, coupling the current generator 23 to the sum circuit 24 as a result. This leads to a negative step offset being imposed on the sum signal $V_{SUM}$ when the converter enters in asynchronous mode. For instance, the sum signal VSUM in the diode-mode operation can be expressed as:

$$VSUM(t) = R_{S1}^{ON} \times I_{COIL}(t) + K(t) \times R/R1 - I_{DMFF}R$$

In one or more embodiments as exemplified in FIGS. 3 and 4, both the current $I_{DMFF}$ sourced/sunk by the generator 23 and the adder resistance R can be selected or finely tuned to provide an optimal performance depending on the application scenario. For instance, this tuning can be via simulations as well as by dedicated trimming.

In one or more embodiments, an alternative method of increasing the duty-cycle to compensate the transition between circuit operating modes can comprise reducing the slope of the sawtooth signal K used to perform slope-compensation of the sum signal VSUM. This can advantageously increase system bandwidth and gain (as appreciable via loop AC and stability analysis/modeling, for instance).

Figure 5:
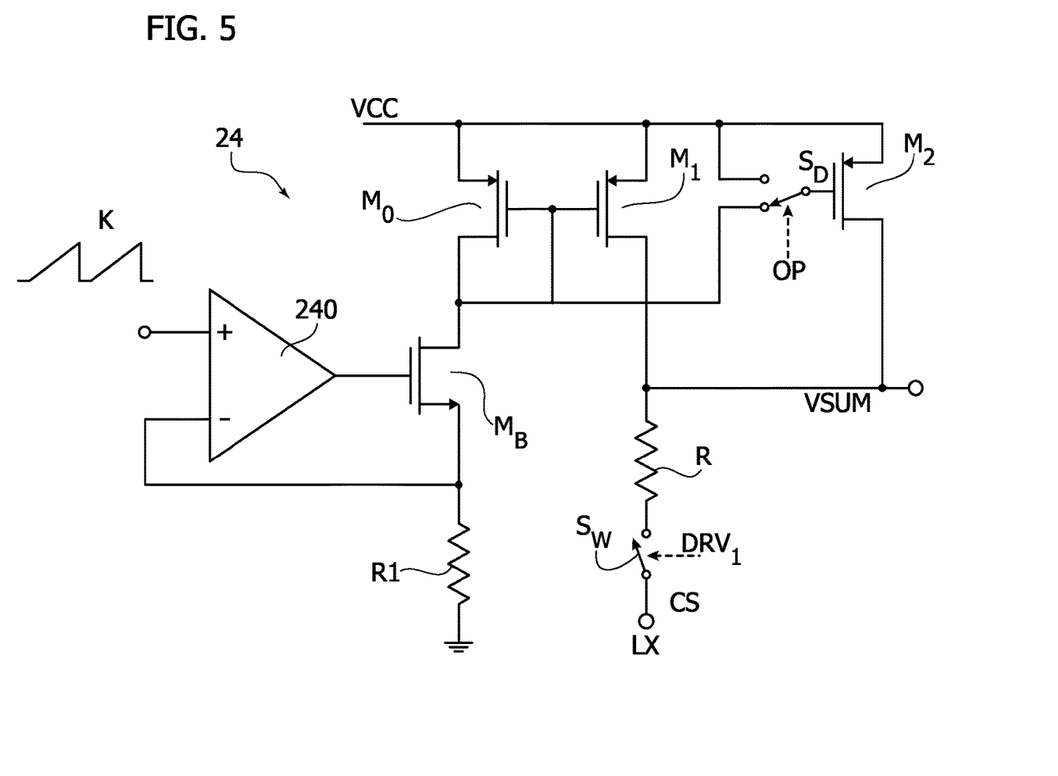
FIGS. 5 and 6 show alternative embodiments of the circuit portion of FIG. 4.
Figure 6:
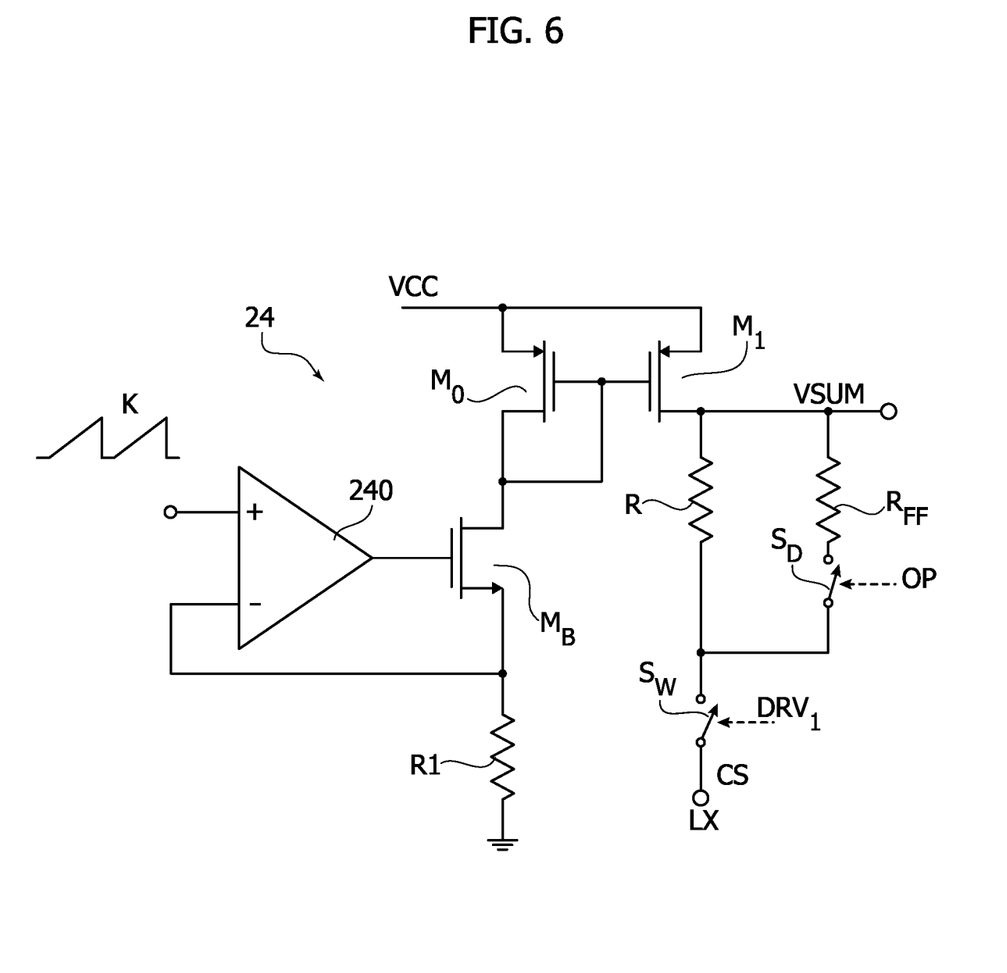

FIGS. 5 and 6 shows possible implementations of the adder circuit 24 configured to increase the duty-cycle and to compensate the transition between circuit operating modes. This may involve reducing the slope of the sawtooth signal K used to perform slope-compensation of the sum signal VSUM.

These implementations may operate a variation of a slope of the sawtooth signal K and may be particularly suited in scenarios where the duty-cycle δ in diode mode is estimated to be well below 25% (due to VIN≥VOUT), that is when the slope compensation signal K has a reduced impact.

As exemplified in FIG. 5, the current mirror M0, M1 can comprise a further transistor M2 selectively couplable, via the switch SD: as a further transistor of the current mirror arrangement M0, M1, or in parallel to the mirror arrangement M0, M1.

For the sake of simplicity, current mirror M0, M1, M2 having p-channel transistors is discussed in the following, being otherwise understood that one or more embodiments may comprise n-channel or other kind of transistors.

For instance, when the transistor M2 is coupled to the current mirror arrangement M0, M1, the following expression may apply:

$$\left(\frac{W}{L}\right)_{M0} = \left(\frac{W}{L}\right)_{M1} + \left(\frac{W}{L}\right)_{M2}$$

Where: W is the channel width of a transistor, L is the channel length of a transistor, and the subscripts outside the parentheses indicate the respective transistor M0, M1, M2 to which the W-L ratio refers.

As exemplified in FIG. 5:
during the synchronous mode operation, the switch $S_D$ may be in a first, e.g., OFF-state, so that the transistor M2 forms part of the current mirror arrangement M0, M1, M2; as a result, the sum signal $V_{SUM}$ can be expressed as $$VSUM(t) = R_{S1}^{ON} \times I_{COIL}(t) + K(t) \times R/R1;$$

when the converter transitions to asynchronous mode, the mode signal OP switches the switch $S_D$ to go in an ON-state, disconnecting the transistor M2 from the current mirror arrangement M0, M1 and from the mirror output branch, consequently reducing the mirroring factor of the (P-channel) current mirror M0, M1 that sources at the sum node $V_{SUM}$ the converted-in-current sawtooth signal K; this is equivalent to reducing the slope of the sawtooth signal, as the sum signal can be expressed as:

$$VSUM(t) = R_{ON}^{LS} \times I_{COIL}(t) + K(t) \times \frac{R}{R1} \times \frac{(W/L)_{M1}}{(W/L)_{M0}}$$

It is noted that the mirroring factor in diode-mode $$\frac{(W/L)_{M1}}{(W/L)_{M0}}$$

can be smaller than the mirroring factor in synchronous mode independently of its amount (e.g., above or equal to unity); this ratio is indicative of slope compensation reduction, therefore being indicative of the feed-forward strength.

As exemplified in FIG. 5, the precise value of mirroring factor $$\frac{(W/L)_{M1}}{(W/L)_{M0}}$$

can be selected and finely tuned in order to obtain a desired circuit performance (both in simulation as well as with dedicated trimming, for instance).

FIG. 6 is exemplary of a further alternative implementation of the solution of FIG. 4 to increase the duty-cycle, to compensate the transition between circuit operating modes, by reducing the slope of the sawtooth signal K used to perform slope-compensation of the sum signal $V_{SUM}$.

As exemplified in FIG. 6, the sum circuit 24 comprises a resistance $R_{FF}$ (e.g., a resistor) selectively couplable between the sum signal node $V_{SUM}$ and the switching node Lx, in parallel to the sensing resistance R.

For the sake of simplicity, resistance $R_{FF}$ of the sum circuit 24 is considered to have, in the following, a value equal to that of the adding resistor R, being otherwise understood that such a value for the resistance $R_{FF}$ of the sum circuit 24 is purely exemplary and in no way limiting.

As exemplified in FIG. 6:
during the synchronous mode operation, the switch $S_D$ may be in a first, e.g., OFF-state, so that the resistance $R_{FF}$ is decoupled from the switching node Lx and so that the sum signal $V_{SUM}$ can be expressed as $$VSUM(t) = R_{S1}^{ON} \times I_{COIL}(t) + K(t) \times R/R1;$$

when the converter transitions to asynchronous mode, the mode signal OP switches the switch $S_D$ to go in an ON-state, coupling the resistance RFF between node VSUM and switching node Lx, in parallel to the adding resistance R; this is equivalent to reducing the slope of the sawtooth signal, as the sum signal can be expressed as:

$$VSUM(t) = R_{ON}^{LS} \times I_{COIL}(t) + K(t) \times \frac{R \times R}{R+R} = R_{ON}^{LS} \times I_{COIL}(t) + K(t) \times \frac{R}{2}$$

It is noted that the value of the resistance $R_{FF}$ can be set and finely tuned (both in simulation as well as with dedicated trimming, for instance) to obtain the desired circuit performance.

A further alternative embodiment of the solution of FIG. 6 may involve decomposing adding resistance R in a series of different electric components coupled therebetween and varying the slope of the sawtooth signal by selectively shorting some of such series-connected electric components.

One or more embodiments as exemplified in FIGS. 5 and 6 may both move an operating point of the feedback loop of the converter and change the DC-DC open loop characteristic by reducing the slope compensation. This can support further compensating the transition from synchronous to asynchronous mode (i.e., the DC-DC loop is faster and more reactive due to an increased gain and bandwidth). At the same time, there may be a reduction of the gain margin with higher susceptibility at high frequency (i.e., jitter). This can be well tolerated if the system has available gain margin.

It is noted that, while a simple comparator can signal mode operation change, this can happen in an asynchronous manner with respect to the switching cycle. One or more embodiments envisage to re-synchronize the threshold detection and mode operation change with the beginning of the new switching cycle, that is with the moment when the feed-forward compensation takes place. This involves:
synchronizing applying of feed-forward compensation at the beginning of the Ton, so that the control signal VC (as exemplified in FIG. 3) or the sum signal VSUM (as exemplified in FIGS. 4 to 6) vary in a step-wise manner; and assuming that the converter circuit 10 was in steady state before changing operation mode, changing the switching point or time at which the PWM comparator triggers with respect to the previous switching cycle (when the converter was operated in synchronous mode), extending the Ton with respect to the previous cycle, as a result of having a higher control signal VC (as exemplified in FIG. 3) or having a lower sum signal VSUM (as exemplified in FIGS. 4 to 6).

The proposed solution permits thus a feed-forward control to overcome specific phenomena/events maintaining high performance. The proposed solution has a negligible impact on power consumption, since it simply involves the generation of a proper current sourced to (or sunk from) the control signal node $V_C$ or the sum node $V_{SUM}$.

In terms of system complexity and area consumption, there are negligible differences with respect to an implementation without the proposed feed-forward compensation and the advantages overcome such added minor complexity. Eventually, a reduced logic 28 can be used to trigger OP the feed-forward in response to the phenomena to compensate, and a current mirror M0, M1 can be used to create the proper feed-forward current $I_{DMFF}$.

In general, the proposed feed-forward implementation allows more than one feed-forward to work, regardless of the others (i.e., the presence of a specific feed-forward does not preclude/impair the action of another feed-forward), e.g., thanks to the possibility of adding a plurality of feed-forward currents therebetween.

As mentioned before, in various embodiments, the control circuit 20 may also be integrated in an integrated circuit. In this case, the integrated circuit may comprise:
 a terminal for connection to the feedback circuit 12, which may also be integrated in the same integrated circuit;
 a terminal for connection to the current sensor 14, which may also be integrated in the same integrated circuit;
 one or more terminals for providing respective one or more drive signals $DRV_1$, $DRV_2$ to a switching stage of an electronic converter 10, wherein also the one or more of the switches S1, S2 of the switching stage may be integrated in the integrated circuit;
 a driver circuit 28 configured to generate the one or more drive signals as a function of the PWM signal VM, wherein the driver circuit 28 is configured to change mode of operation via the mode selection signal OP as a function of a comparison between the input and output voltage; and
 a PWM signal generator circuit 22, 24, 26 configured to generate the PWM signal VM, wherein the PWM signal generator circuit 22, 24, 26 comprises at least one current mirror M0, M1 wherein the respective current $I_{DMFF}$ is varied (almost instantaneously) as a function of mode selection signal OP.

It will be otherwise understood that the various individual implementing options exemplified throughout the figures accompanying this description are not necessarily intended to be adopted in the same combinations exemplified in the figures. One or more embodiments may thus adopt these (otherwise non-mandatory) options individually and/or in different combinations with respect to the combination exemplified in the accompanying figures.

The claims are an integral part of the technical teaching provided herein with reference to the embodiments.

Without prejudice to the underlying principles, the details and embodiments may vary, even significantly, with respect to what has been described by way of example only, without departing from the extent of protection. The extent of protection is defined by the annexed claims.

The invention claimed is:

1. A control circuit configured to control a switching stage of an electronic converter that includes an inductance and operates to receive an input voltage at input terminals and provide an output voltage at output terminals, comprising:
 one or more first terminals configured to provide one or more respective drive signals to one or more electronic switches of said switching stage;
 a second terminal configured to receive from a feedback circuit a first feedback signal proportional to said output voltage;
 a third terminal configured to receive from a current sensor a second feedback signal proportional to a current flow in said inductance;
 a driver circuit configured to provide:
  said one or more drive signals as a function of a Pulse-Width Modulation (PWM) signal; and
  a mode selection signal asserted in response to a comparison of said input voltage to said output voltage which indicates a change in operating mode of the electronic converter; and
 a PWM signal generator circuit configured to generate said PWM signal as a function of said first feedback signal, said second feedback signal, a reference voltage and a slope compensation signal, said PWM signal generator circuit comprising:
  a first amplifier circuit configured to provide a first control signal as a function of a difference between said reference voltage and said first feedback signal;
  a sum circuit configured to provide a second control signal indicative of a superposition of said slope compensation signal and said second feedback signal; and
  a comparator circuit configured to compare said first control signal and said second control signal and generate said PWM signal; and
 a feed-forward compensation circuit configured to supply a fixed compensation current offset in response to the assertion of said mode selection signal at a beginning of a first switching cycle in which the operating mode of the electronic converter changes, wherein said fixed compensation current offset is at least one of: sourced to modulate the first control signal output from the first amplifier circuit after a buffer stage that decouples the feed-forward compensation circuit from an integrating node of the first amplifier circuit, or sunk to modulate the second control signal output from the sum circuit, thereby preventing the first amplifier circuit from moving its output in response to the change in operating mode.

2. The control circuit according to claim 1, wherein assertion of the mode selection signal indicates that said electronic converter is changing from a synchronous mode of operation to a diode mode of operation.

3. The control circuit according to claim 1, wherein said sum circuit comprises:
 a second amplifier circuit having a resistive feedback branch and configured to receive said slope compensation signal;
 a current mirror coupled to an output of said second amplifier circuit; and a sum node coupled to an output of said current mirror and selectively couplable to said third terminal of the control circuit via a further switch configured to be driven by said one or more drive signals.

4. The control circuit according to claim 3, wherein said current mirror comprises a current mirror branch selectively activatable, via a second switch operated as a function of said mode selection signal, to vary a current at said sum node of the sum circuit.

5. The control circuit according to claim 3, further comprising a by-pass branch selectively couplable, via a third switch operated as a function of said mode selection signal, to said sum node of the sum circuit and to said further switch configured to be driven by said one or more drive signals.

6. The control circuit of claim 5, wherein said by-pass branch comprises a resistance equal to a resistance used to obtain said second feedback signal proportional to a current flow in an inductance of said switching stage.

7. The control circuit according to claim 1, wherein said electronic converter is a boost converter having said inductance coupled to an input terminal of said electronic converter.

8. An electronic converter, comprising:
the control circuit according to claim 1; and
a switching stage comprising said inductance and configured to receive said input voltage at the input terminals and to provide said output voltage at the output terminals, and
wherein the control circuit is coupled to said switching stage.

9. A control circuit configured to control a switching stage of an electronic converter that includes an inductance and operates to receive an input voltage at input terminals and provide an output voltage at output terminals, comprising:
a driver circuit configured to provide one or more drive signals as a function of a Pulse-Width Modulation (PWM) signal to control said switching stage;
a comparator configured to compare the output voltage to the input voltage and assert a mode selection signal in response thereto which is indicates change in operational mode of the electronic converter from a synchronous mode to a diode mode;
a PWM signal generator circuit comprising:
an amplifier circuit configured to provide a first control signal as a function of a difference between a reference voltage and a first feedback signal proportional to said output voltage;
a sum circuit configured to provide a second control signal indicative of a superposition of a slope compensation signal and a second feedback signal proportional to current in said inductance; and
a comparator circuit configured to compare said first control signal and said second control signal and generate said PWM signal; and
a feed-forward compensation circuit configured to source a fixed compensation current in response to the assertion of the mode selection signal at a beginning of a first switching cycle in which the operational mode of the electronic converter changes to modulate the first control signal output after a buffer stage that decouples the feed-forward compensation circuit from an integrating node of the amplifier circuit in response to the assertion of said mode selection signal or sink the fixed compensation circuit to modulate the second control signal output from the sum circuit, thereby preventing the amplifier circuit from moving its output in response to change in operating mode.

10. The control circuit according to claim 9, wherein said electronic converter is a boost converter having said inductance coupled to an input terminal of said electronic converter.

11. An electronic converter, comprising:
the control circuit according to claim 9; and
a switching stage comprising said inductance and configured to receive said input voltage at the input terminals and to provide said output voltage at the output terminals, and
wherein the control circuit is coupled to said switching stage.

12. A control circuit configured to control a switching stage of an electronic converter that includes an inductance and operates to receive an input voltage at input terminals and provide an output voltage at output terminals, comprising:
a driver circuit configured to provide one or more drive signals as a function of a Pulse-Width Modulation (PWM) signal to control said switching stage;
a comparator configured to compare the output voltage to the input voltage and assert a mode selection signal in response thereto which is indicates change in operational mode of the electronic converter from a synchronous mode to a diode mode;
a PWM signal generator circuit comprising:
a first amplifier circuit configured to provide a first control signal as a function of a difference between a reference voltage and a first feedback signal proportional to said output voltage;
a sum circuit configured to provide a second control signal indicative of a superposition of a slope compensation signal and a second feedback signal proportional to current in said inductance; and
a comparator circuit configured to compare said first control signal and said second control signal and generate said PWM signal; and
a feed-forward compensation circuit configured to apply a fixed compensation current offset in response to the assertion of said mode selection signal at a beginning of s first switching cycle in which an operating mode of the electronic converter changes, wherein said fixed compensation current offset is at least one of: sourced to modulate the first control signal output from the first amplifier circuit after a buffer stage that decouples the feed-forward compensation circuit from an integrating node of the first amplifier circuit, or sunk to modulate the second control signal output from the sum circuit, thereby preventing the first amplifier circuit from moving its output in response to the change in operational mode.

13. The control circuit according to claim 12, wherein said sum circuit comprises:
a second amplifier circuit having a resistive feedback branch and configured to receive said slope compensation signal;
a current mirror coupled to an output of said second amplifier circuit; and
a sum node coupled to an output of said current mirror and selectively couplable to receive the second feedback signal via a further switch configured to be driven by said one or more drive signals.

14. The control circuit according to claim 13, wherein said current mirror comprises a current mirror branch selectively activatable in response to the assertion of said mode selection signal to vary a current at said sum node of the sum circuit.

15. The control circuit according to claim 13, further comprising a resistive by-pass branch selectively couplable between said further switch and said sum node of the sum circuit in response to the assertion of said mode selection signal.

16. The control circuit according to claim 13, wherein said electronic converter is a boost converter having said inductance coupled to an input terminal of said electronic converter.

17. An electronic converter, comprising:
   the control circuit according to claim 12; and
   a switching stage comprising said inductance and configured to receive said input voltage at the input terminals and to provide said output voltage at the output terminals, and
   wherein the control circuit is coupled to said switching stage.

* * * * *